US012658957B2

(12) United States Patent
Jakobsson

(10) Patent No.: US 12,658,957 B2
(45) Date of Patent: Jun. 16, 2026

(54) RECEIVER IMAGE CALIBRATION WITH NOISE FROM A POWER AMPLIFIER

(71) Applicant: Telefonaktiebolaget LM Ericsson (publ), Stockholm (SE)

(72) Inventor: Peter Jakobsson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 289 days.

(21) Appl. No.: 18/704,786

(22) PCT Filed: Oct. 27, 2021

(86) PCT No.: PCT/EP2021/079897
§ 371 (c)(1),
(2) Date: Apr. 25, 2024

(87) PCT Pub. No.: WO2023/072392
PCT Pub. Date: May 4, 2023

(65) Prior Publication Data
US 2025/0247121 A1 Jul. 31, 2025

(51) Int. Cl.
*H04B 1/30* (2006.01)
*H04L 27/38* (2006.01)

(52) U.S. Cl.
CPC ............. *H04B 1/30* (2013.01); *H04L 27/389* (2013.01)

(58) Field of Classification Search
CPC .......... H04B 1/30; H04L 27/38; H04L 27/389
See application file for complete search history.

(56) References Cited

U.S. PATENT DOCUMENTS

2002/0177425 A1* 11/2002 Li ............................ H03D 7/18
455/302
2005/0147190 A1* 7/2005 Nishikawa .......... H04L 27/0014
375/343
(Continued)

FOREIGN PATENT DOCUMENTS

EP 0473373 A2 3/1992
EP 2712140 A1 * 3/2014 ........... H04L 27/364

OTHER PUBLICATIONS

International Search Report and Written Opinion dated Jul. 7, 2022 for International Application No. PCT/EP2021/079426 filed Oct. 22, 2021; consisting of 15 pages.
(Continued)

*Primary Examiner* — Nguyen T Vo
(74) *Attorney, Agent, or Firm* — Weisberg I.P. Law, P.A.

(57) ABSTRACT

A method and homodyne receiver for receiver image calibration with noise from a power amplifier are disclosed. According to one aspect, a method in a homodyne receiver includes estimating an amplitude error based at least in part on a first function of I and Q samples and estimate a phase error based at least in part on a second function of the I and Q samples, the amplitude and phase errors arising from noise that is coupled to the first receive path when a portion of transceiver circuitry of the homodyne receiver is disabled. The method also includes correcting the I and Q samples in the first receive path when the portion of transceiver circuitry of the homodyne receiver is subsequently reenabled, corrections to the I and Q samples being based at least in part on the estimated amplitude and phase error.

20 Claims, 12 Drawing Sheets

(56) References Cited

U.S. PATENT DOCUMENTS

| | | |
|---|---|---|
| 2008/0130780 A1 | 6/2008 | Cho et al. |
| 2015/0118970 A1 | 4/2015 | Thoukydides et al. |
| 2018/0234194 A1 | 8/2018 | Li et al. |

OTHER PUBLICATIONS

Tyra V1 RX IQ error estimation with PA; Feb. 19, 2021; consisting of 9 pages.

* cited by examiner

WIRELESS DEVICE 22

SW 56

CLIENT APPLICATION 58

HW 44

WD HOMODYNE RECEIVER 26

ANTENNAS 48

IQ ERROR ESTIMATION CIRCUIT 26A

IQ CORRECTION CIRCUIT 26B

PROCESSING CIRCUITRY 50

MEMORY 54

PROCESSOR 52

NETWORK NODE 16

SW 42

HW 28

NN HOMODYNE RECEIVER 24

ANTENNAS 34

IQ ERROR ESTIMATION CIRCUIT 24A

IQ CORRECTION CIRCUIT 24B

PROCESSING CIRCUITRY 36

MEMORY 40

PROCESSOR 38

32

ESTIMATE AN AMPLITUDE ERROR BASED AT LEAST IN PART ON A FIRST FUNCTION OF I AND Q SAMPLES AND ESTIMATE A PHASE ERROR BASED AT LEAST IN PART ON A SECOND FUNCTION OF THE I AND Q SAMPLES, THE ESTIMATE OF THE AMPLITUDE ERROR BEING FURTHER BASED ON A PRIOR ESTIMATE OF THE AMPLITUDE ERROR AND THE ESTIMATE OF THE PHASE ERROR BEING FURTHER BASED ON A PRIOR ESTIMATE OF THE PHASE ERROR, THE AMPLITUDE AND PHASE ERRORS ARISING FROM NOISE THAT IS COUPLED TO THE FIRST RECEIVE PATH WHEN A PORTION OF TRANSCEIVER CIRCUITRY OF THE HOMODYNE RECEIVER IS DISABLED S10

CORRECT THE I AND Q SAMPLES IN THE FIRST RECEIVE PATH WHEN THE PORTION OF TRANSCEIVER CIRCUITRY OF THE HOMODYNE RECEIVER IS SUBSEQUENTLY REENABLED, THE CORRECTIONS TO THE I AND Q SAMPLES BEING BASED AT LEAST IN PART ON THE ESTIMATED AMPLITUDE AND PHASE ERROR S20

FIG. 3

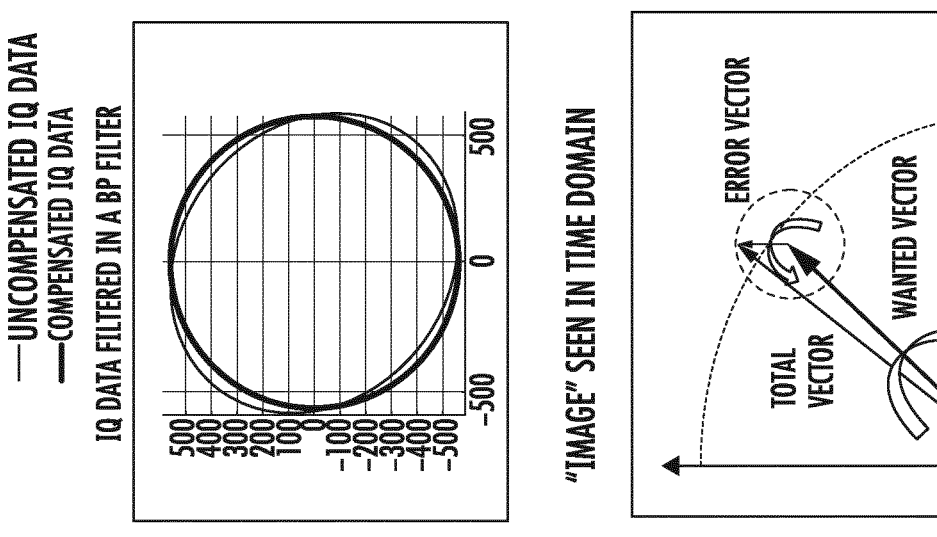
— UNCOMPENSATED IQ DATA
— COMPENSATED IQ DATA
IQ DATA FILTERED IN A BP FILTER
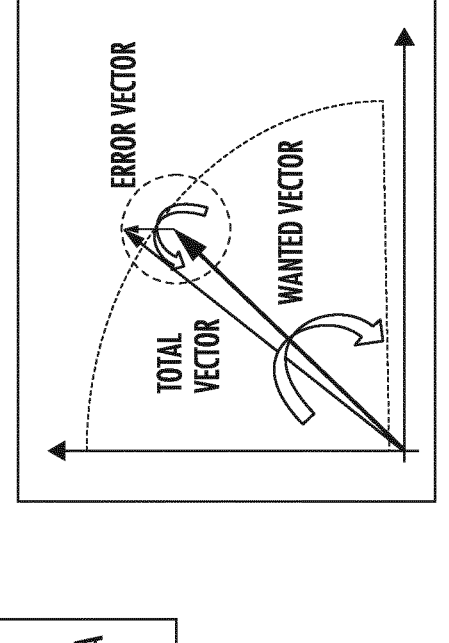
"IMAGE" SEEN IN TIME DOMAIN
ERROR VECTOR
WANTED VECTOR
TOTAL VECTOR
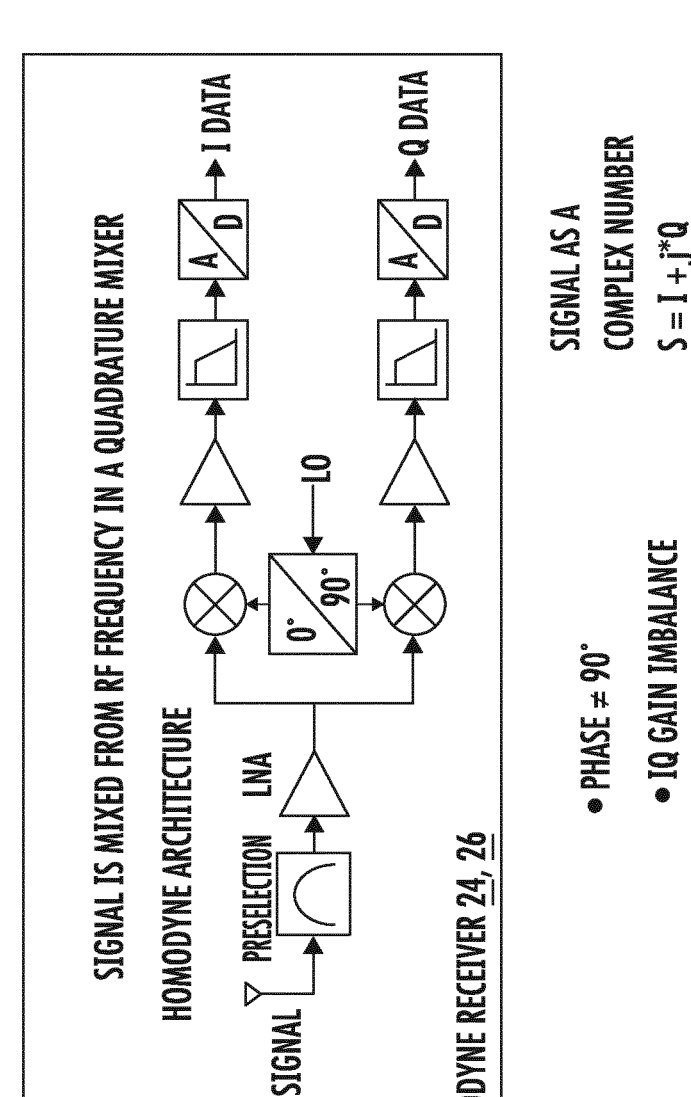
SIGNAL IS MIXED FROM RF FREQUENCY IN A QUADRATURE MIXER
HOMODYNE ARCHITECTURE
I DATA
Q DATA
LO
RF SIGNAL    PRESELECTION    LNA
HOMODYNE RECEIVER 24, 26
SIGNAL AS A
COMPLEX NUMBER
S = I + j*Q
• PHASE ≠ 90°
• IQ GAIN IMBALANCE
FIG. 5

RECEIVER IMAGE CALIBRATION WITH NOISE FROM A POWER AMPLIFIER

CROSS-REFERENCE TO RELATED APPLICATION

This application is a Submission Under 35 U.S.C. § 371 for U.S. National Stage Patent Application of International Application Number: PCT/EP2021/079897, filed Oct. 27, 2021 entitled "RECEIVER IMAGE CALIBRATION WITH NOISE FROM A POWER AMPLIFIER," the entirety of which is incorporated herein by reference.

TECHNICAL FIELD

The present disclosure relates to wireless communication and in particular, to receiver image calibration with noise from a power amplifier.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

In 5G, one technique to improve system performance is to use an advanced antenna system (AAS). A phased (or time delay) controlled array of antennas enable beamforming of the transmitted and received radio frequency (RF)-signal, which can be used to both increase capacity and coverage for a cellular system.

Several different techniques exist to control the relative phase between RF-signals in the array. Here is list of the most common with a short explanation about their properties.

Analog beamforming: The RF-signal or local oscillator (LO)-signal (used for up and down conversion of the wanted signal) is delayed or phase shifted.

Digital beamforming—The wanted signal (example an orthogonal frequency division multiplexed (OFDM) modulated signal) is digitally delayed in time the time domain or phase-shifted in the frequency domain.

Hybrid beamforming: A mix of Analog and Digital beamforming.

The 5G system is planned to be deployed on both new frequency bands as well as on existing bands. The trend is that the bandwidth (BW) of each defined operating band will scale with the carrier frequency and a BW as high as several GHz will be common for bands in the 24-43 GHz frequency range.

For receiver functionality, the trend is that architecture is moving from heterodyne to homodyne, since the homodyne architecture opens up for integration of the anti-aliasing filters and has superior spurious response performance (needed due to higher and higher requirement on co-locate/co-existence interference levels that come from street level deployment and general densification of the deployment scenario).

There is also a trend for street level deployment that needs a wireless backhaul link. The new integrated access and backhaul (IAB) features introduced in the 3GPP standard are one possible solution to deploy street level BS without any fiber connection.

The homodyne receiver architecture has been used for a long time in many applications. It has many benefits, but also some impairments that need to be suppressed. One is that the IQ-error will degrade the wanted signal quality.

As there is a need to support self-backhaul, the requirement on signal quality (i.e., allowed error vector magnitude (EVM)/signal to noise plus distortion ratio (SNDR)) will be heightened as 256QAM modulation is used between two mmW IAB nodes (IAB child to IAB donor or opposite communication direction). In coming versions of 3GPP, 1024QAM modulation is being considered. So far this is being considered only for <6 GHz bands, but probably will be extend to higher frequencies at a later date. All this together will push for a receiver design with even lower impairments that will affect the received signal quality (measured as EVM).

Many attempts to solve the problem of IQ-error and how to digitally compensate IQ-error in a homodyne receiver are known. These approaches have required extra analog hardware for calibration. Some wireless radio systems place stringent requirements on IQ imbalance and require more advanced solutions or other receiver architectures.

SUMMARY

Some embodiments advantageously provide a method and homodyne receiver for receiver image calibration with noise from a power amplifier.

A homodyne receiver architecture opens up for higher integration, but it also suffers from an IQ-error that will influence the received (RX) signal quality.

Some embodiments provide a method and homodyne receiver that uses thermal noise from a power amplifier (PA) as a calibration signal to determine digital compensation for the IQ-error in a homodyne receiver.

The noise from the PA is either looped back using the feedback path that normally is used for measuring the transmitted signal for linearization of the PA with a digital pre-distorter (DPD) Alternatively, or in addition, feedback is provided by using mutual coupling between two antennas in the array of antennas in the homodyne receiver, for example, by using coupling between the antenna for vertical and horizontal polarization in one antenna element.

Some embodiments enable use a highly integrated homodyne receiver in an AAS radio, without adding extra analog HW, such as delay lines, phase shifters or an extra phase locked loop (PLL).

When the calibration signal is noise from the PA, the BW is broadband, so it will give an average IQ-error over the useful BW.

According to one aspect, a processing circuit in a first receive path of a homodyne receiver is provided, the processing circuit configured to estimate and correct an IQ error in the first receive path. The processing circuit includes an IQ error estimation circuit (24A, 26A) configured to estimate an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver is disabled. The processing circuit also includes an IQ correction circuit (24B, 26B) in electrical communication with the IQ error estimation circuit (24A, 26A), the IQ correction circuit (24B, 26B) configured to correct the I and Q samples in the first receive path when the portion of transceiver circuitry of the homodyne receiver is subsequently reenabled, the corrections to the I and Q samples being based at least in part on the estimated amplitude and phase error.

According to this aspect, in some embodiments, the first function includes a sum over N samples of a difference between a square of an I sample and a square of a Q sample, and the second function includes a sum over N samples of a product of the I sample and the Q sample, N being a positive integer. In some embodiments, the IQ error estimation circuit (24A, 26A) is activated to perform estimates of amplitude errors and phase errors at a calibration time, the calibration time being set according to one of a change in temperature and a user input. In some embodiments, the noise is coupled from a power amplifier in a transmit path of the homodyne receiver. In some embodiments, the noise is coupled from a feedback signal used to linearize the power amplifier. In some embodiments, the portion of transceiver circuitry of the homodyne receiver that is disabled includes all other receive paths of the homodyne receiver and all transmit paths of the homodyne receiver. In some embodiments, the noise is coupled from a first antenna element of the homodyne receiver to a second antenna element of the homodyne receiver. In some embodiments, the portion of the transceiver circuitry of the homodyne receiver that is disabled excludes a second receive path of the homodyne receiver. In some embodiments, the first receive path is coupled to a first antenna of cross-polarized antenna elements and the second receive path is coupled to a second antenna of the cross-polarized antenna elements. In some embodiments, the corrections to the I and Q samples are linear combinations of the estimated amplitude and phase error and the I and Q samples.

According to another aspect, a method in a receive path of a homodyne receiver to estimate and correct an IQ error in a first receive path is provided. The method includes estimating an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver is disabled. The method also includes correcting the I and Q samples in the first receive path when the portion of transceiver circuitry of the homodyne receiver is subsequently reenabled, corrections to the I and Q samples being based at least in part on the estimated amplitude and phase error.

According to this aspect, in some embodiments, the first function includes a sum over N samples of a difference between a square of an I sample and a square of a Q sample, and the second function includes a sum over N samples of a product of the I sample and the Q sample, N being a positive integer. In some embodiments, the IQ error estimation circuit (24A, 26A) is activated to perform estimates of amplitude errors and phase errors at a calibration time, the calibration time being set according to one of a change in temperature and a user input. In some embodiments, the noise is coupled from a power amplifier in a transmit path of the homodyne receiver. In some embodiments, the noise is coupled from a feedback signal used to linearize the power amplifier. In some embodiments, the portion of transceiver circuitry of the homodyne receiver that is disabled includes all other receive paths of the homodyne receiver and all transmit paths of the homodyne receiver. In some embodiments, the noise is coupled from a first antenna element of the homodyne receiver to a second antenna element of the homodyne receiver. In some embodiments, the portion of the transceiver circuitry of the homodyne receiver that is disabled excludes a second receive path of the homodyne receiver. In some embodiments, the first receive path is coupled to a first antenna of cross-polarized antenna elements and the second receive path is coupled to a second antenna of the cross-polarized antenna elements. In some embodiments, the corrections to the I and Q samples are linear combinations of the estimated amplitude and phase error and the I and Q samples.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart of an example process in for IQ error estimation and correction in a homodyne receiver; FIG. 5 shows that if the phase difference between I and Q LO signals deviates from 90 degrees and/or there is a gain imbalance between the I and Q signal paths;

DETAILED DESCRIPTION

Figure 1:
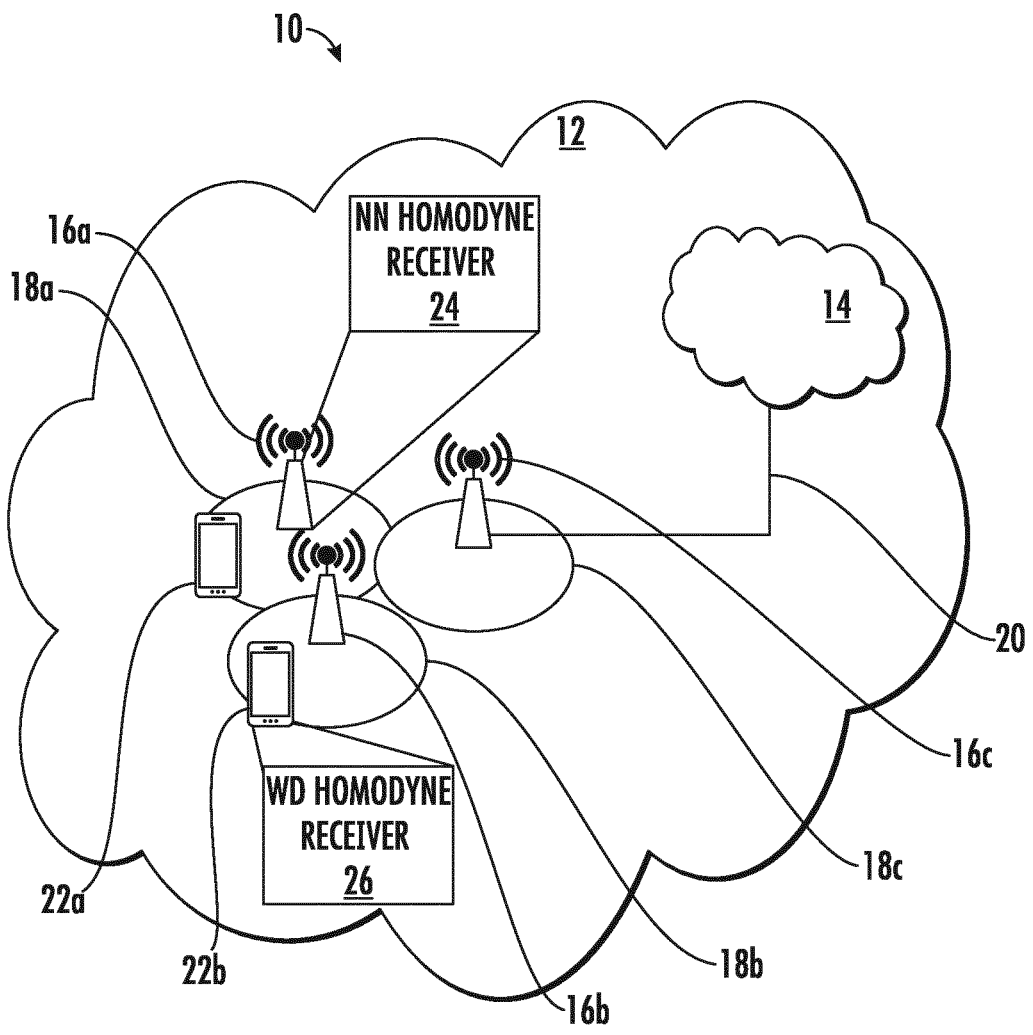
FIG. 1 is a schematic diagram of an example network architecture illustrating a communication system according to principles disclosed herein.

Before describing in detail example embodiments, it is noted that the embodiments reside primarily in combinations of apparatus components and processing steps related to receiver image calibration with noise from a power amplifier. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to receiver image calibration with noise from a power amplifier.

Referring to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

Example implementations, in accordance with an embodiment, of the WD 22 and network node 16 discussed in the preceding paragraphs will now be described with reference to FIG. 2.

The communication system 10 includes a network node 16 provided in a communication system 10 and including hardware 28 enabling it to communicate with the WD 22. The hardware 28 may include a NN homodyne receiver 24 for setting up and maintaining at least a wireless connection 32 with a WD 22 located in a coverage area 18 served by the network node 16. The NN homodyne receiver 24 may be formed as or may include, for example, one or more RF receivers, and/or one or more RF transceivers. The NN homodyne receiver 24 includes an array of antennas 34 to radiate and receive signal(s) carrying electromagnetic waves. The NN homodyne receiver 24 includes an IQ error estimation circuit 24A configured to estimate an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver is disabled. The NN homodyne receiver 24 also includes an IQ correction circuit 24B in electrical communication with the IQ error estimation circuit, the IQ correction circuit configured to correct the I and Q samples in the first receive path when the portion of transceiver circuitry of the homodyne receiver is subsequently reenabled, the corrections to the I and Q samples being based at least in part on the estimated amplitude and phase error.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16.

The communication system 10 further includes the WD 22 already referred to. The WD 22 may have hardware 44 that may include a WD homodyne receiver 26 configured to set up and maintain a wireless connection 32 with a network node 16 serving a coverage area 18 in which the WD 22 is currently located. The WD homodyne receiver 26 may be formed as or may include, for example, one or more RF receivers, and/or one or more RF transceivers. The WD homodyne receiver 26 includes an array of antennas 48 to radiate and receive signal(s) carrying electromagnetic waves. The WD homodyne receiver 26 includes an IQ error estimation circuit 26A configured to estimate an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver is disabled. The WD homodyne receiver 26 also includes an IQ correction circuit 26B in electrical communication with the IQ error estimation circuit, the IQ correction circuit configured to correct the I and Q samples in the first receive path when the portion of transceiver circuitry of the homodyne receiver is subsequently reenabled, the corrections to the I and Q samples being based at least in part on the estimated amplitude and phase error.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

Figure 2:
FIG. 2 is a block diagram of a network node in communication with a wireless device over a wireless connection according to some embodiments of the present disclosure.

In some embodiments, the inner workings of the network node 16 and WD 22 may be as shown in FIG. 2 and independently, the surrounding network topology may be that of FIG. 1.

The wireless connection 32 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as NN homodyne receiver 24 and WD homodyne receiver 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart of an example process in a homodyne receiver such as NN homodyne receiver 24 or WD homodyne receiver for receiver image calibration with noise from a power amplifier. Thus, one or more blocks described herein may be performed by one or more elements of network node 16 such as by r the NN homodyne receiver 24. Also, one or more blocks described herein may be performed by one or more elements of wireless device 22 such as by the WD homodyne receiver 26. The homodyne receivers 24, 26 are configured to estimate an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver is disabled (Block S10). The process also includes correcting the I and Q samples in the first receive path when the portion of transceiver circuitry of the homodyne receiver is subsequently reenabled, corrections to the I and Q samples being based at least in part on the estimated amplitude and phase error (Block S20).

Having described the general process flow of arrangements of the disclosure and having provided examples of hardware and software arrangements for implementing the processes and functions of the disclosure, the sections below provide details and examples of arrangements for receiver image calibration with noise from a power amplifier.

Some embodiments provide receiver image calibration with noise from a power amplifier.

Figure 4:
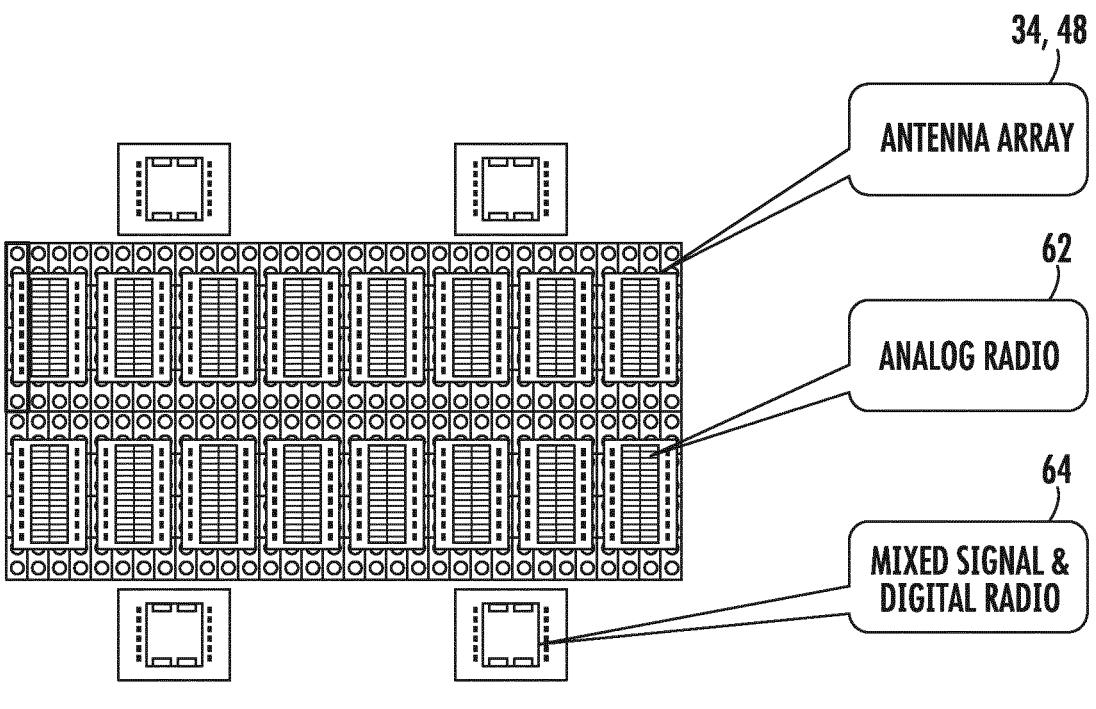
FIG. 4 is an illustration of an AAS radio with 16×32 antenna elements

FIG. 4 is an illustration of an example of an AAS radio 60 with 16×32 antenna elements. This configuration has been chosen as an example, but of course the principles disclosed herein are applicable for any array size and any portioning of the functionality in physical chips. The AAS radio 60 includes an antenna array 34, 48, an analog radio 62 and a mixed signal and digital radio 64. The antenna array 34, 48, the analog radio 62 and the mixed signal and digital radio 64 may be included in the homodyne receiver 24, 26. The analog radio 62 includes the IQ error estimation circuit 24A, 26A and IQ correction circuit 24B, 26B. The homodyne receiver architecture opens up for high integration. The analog part of the radio fits under the antenna. The mixed signal and digital radio 64 can be fitted close to the antenna array 34, 48. In the example above, there is a sub-array of 2×1 and 4 analog ports per digital antenna port. The hybrid beamforming is split between analog beam forming in the analog radio and digital beamforming in the digital radio. A heterodyne receiver architecture would have required many RF and IF filters to support hybrid BF or digital BF. A heterodyne receiver also have issue with spurious response and spurious emission.

FIG. 5 is a simplified block diagram of a front end of the homodyne receiver 24, 26 showing an I signal path and a Q signal path, which ideally would produce two signals that 90 degrees out of phase. However, due to a gain imbalance between the I and Q signal paths, the phase difference between the two signals may deviate from 90 degrees. This deviation is referred to herein as an IQ-error. The IQ-error can be viewed as an image of the wanted signal that is rotating with opposite frequency. With a continuous wave (CW) tone on I and Q channels, an ellipse is obtained instead of a circle, as shown in the IQ-diagram of FIG. 5.

Figure 6:
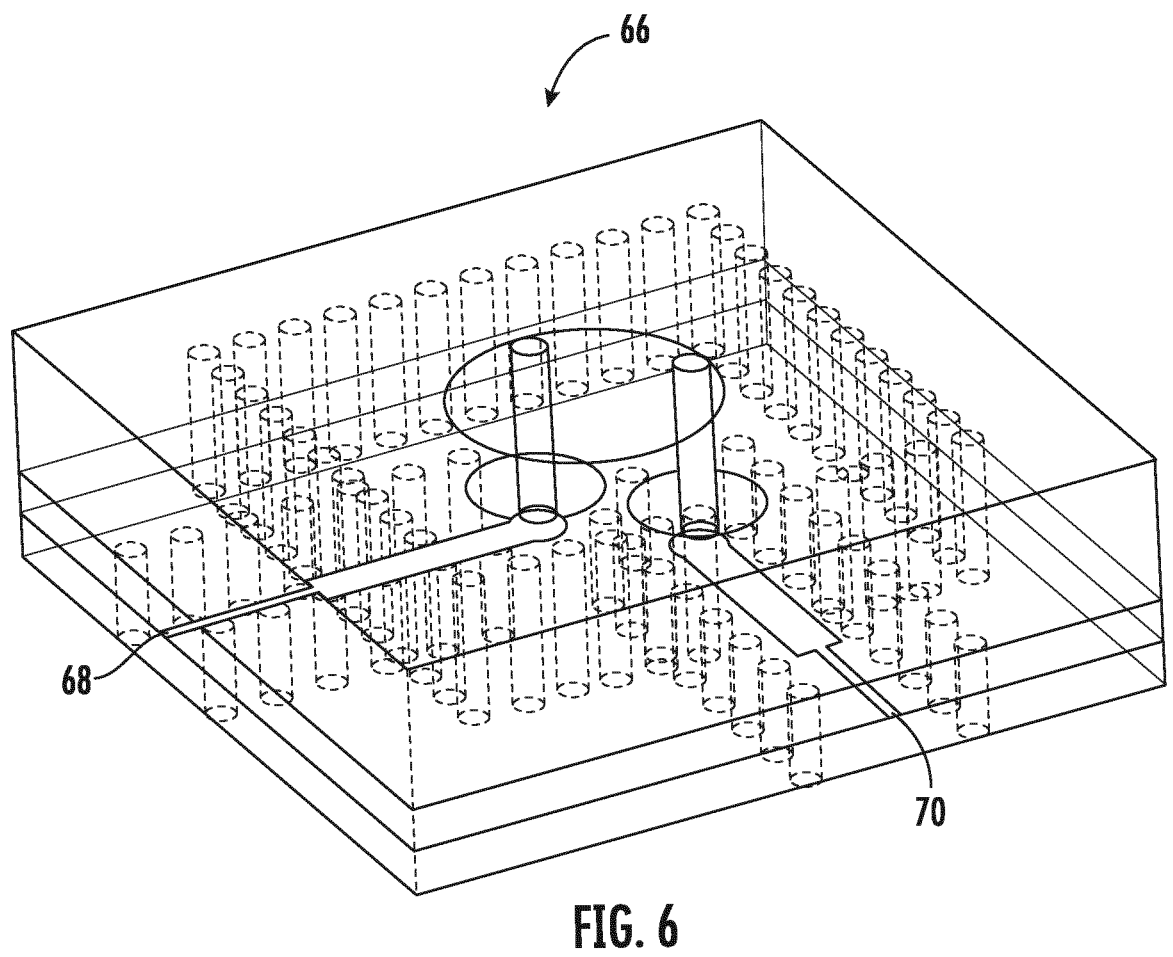
FIG. 6 shows a patch antenna with both vertical and horizontal polarization feed points.

FIG. 6 shows a patch antenna 66 with both vertical and horizontal polarization feed points 68, 70. In some embodiments, the coupling between the two polarizations is used to couple noise from the transmitter PA to the receiver to be calibrated.

Figure 7:
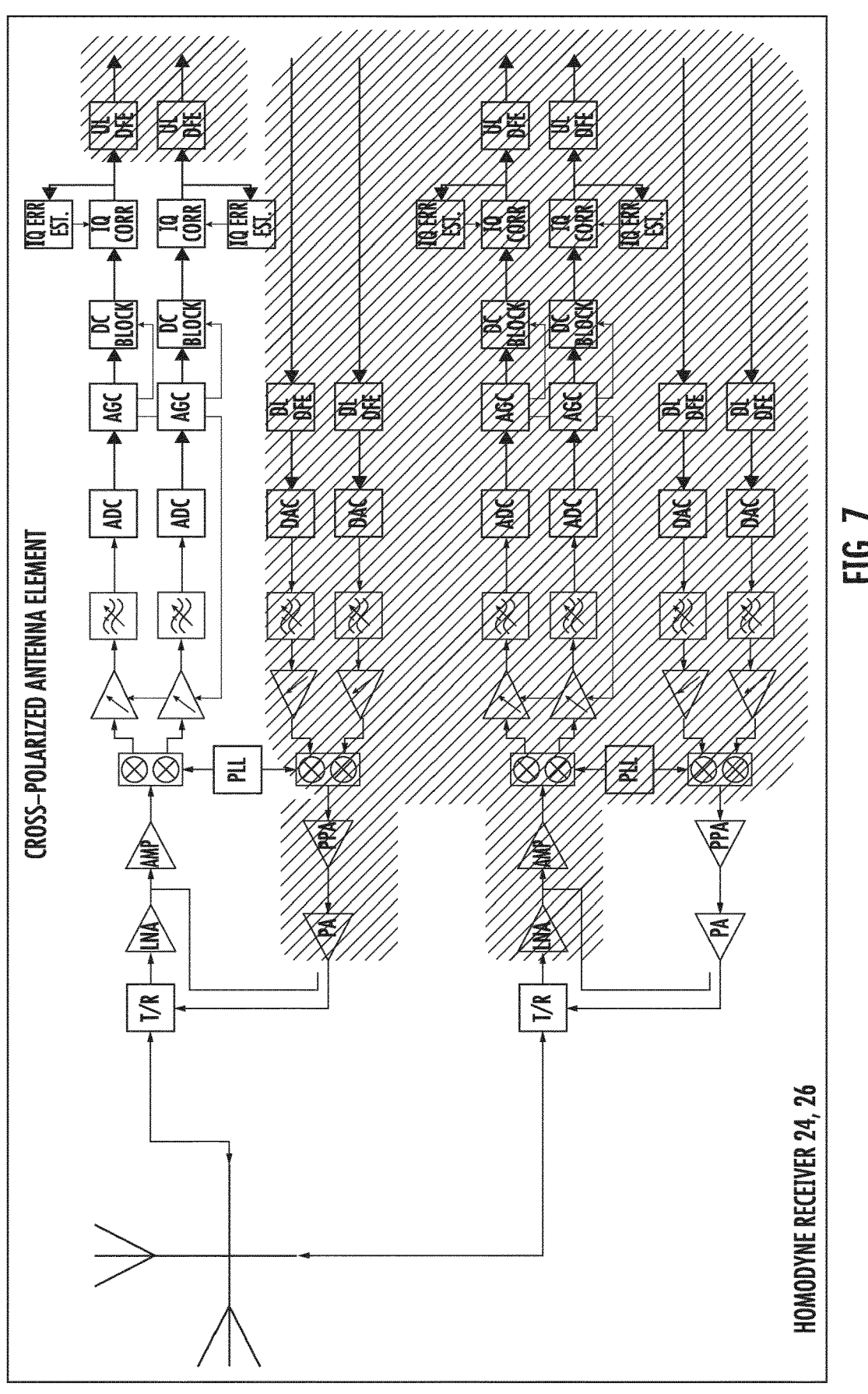
FIG. 7 is a block diagram that shows how the PA or PA and pre-power amplifier (PPA) are turned for the vertical antenna polarization, but with the remainder of the transmitter turned off.

FIG. 7 is a block diagram of an example that shows how the PA or PA and pre-power amplifier (PPA) are turned on for the vertical antenna polarization, but with the remainder of the transmitter (shaded) turned off, until the IQ-error estimation/correction blocks for the horizontal antenna polarization are is activated. The noise from the PA leaks into the receiver due to the limited isolation in a dual polarization patch antenna. The noise from the PA is amplified by the low noise amplifier LNA and base band amplifiers.

Figure 8:
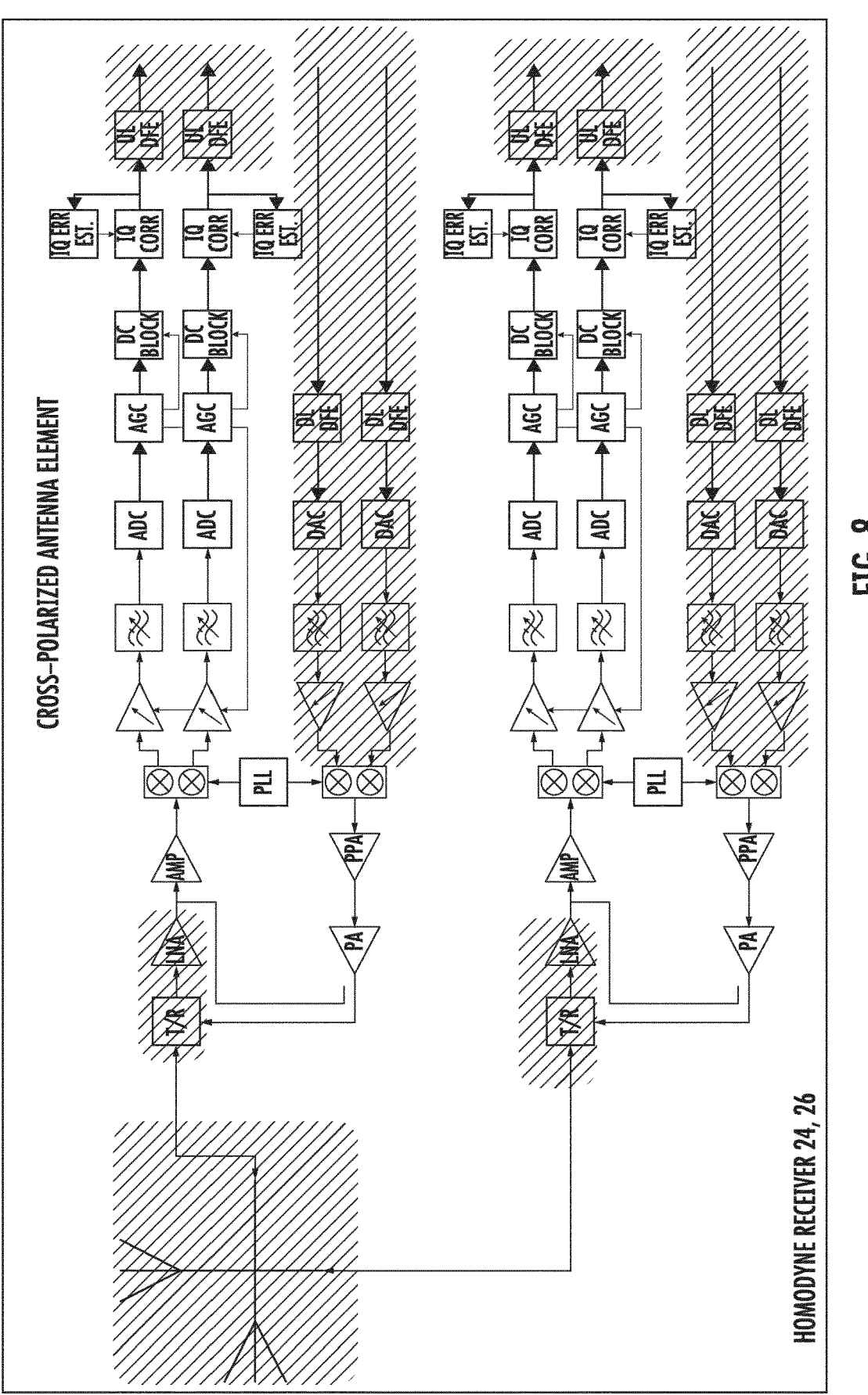
FIG. 8 is a block diagram that shows the PA or PA and PPA are turned off, with the remainder of the transmitter turned off.

FIG. 8 is a block diagram that shows an example when the PA or PA and PPA are turned on, with the remainder of the transmitter (shaded) turned off, until the IQ-error estimation/correction blocks are activated. The noise from the PA or PA and PPA leaks into the receiver using the leakage path that is also used for feedback signals for linearization of the PA, i.e., the feedback signal for the digital pre-distorter (DPD) algorithm. The noise from the PA or PA and PPA is amplified by an RF amplifier (AMP), mixer and base band amplifiers. The feedback path is configured in a coupling mode to fit the noise level from the PA or noise level from PA and PPA.

Figure 9:
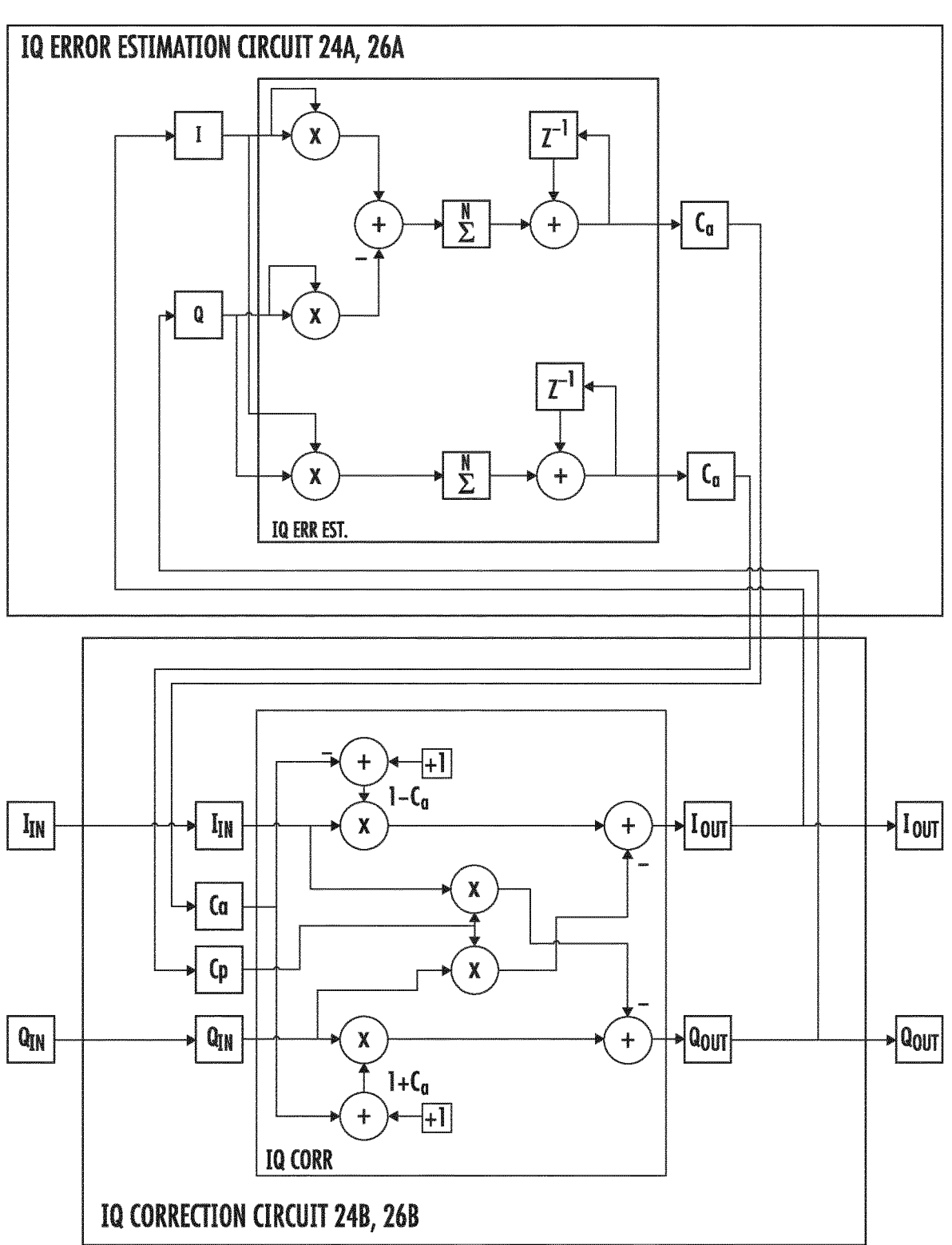
FIG. 9 is a block diagram that shows the functions in the IQ-error estimation circuit (top) and IQ-error correction circuit (bottom)

FIG. 9 is a block diagram that shows an example of the functions in the IQ-error estimation circuit 24A, 26A (top) and IQ correction circuit 24B, 26B (bottom). The correction block can be described with the following equations:

$$I_{ot} = \text{round}((1 - Ca)I_{in} - CpQ_{in}) \tag{1}$$

$$Q_{out} = \text{round}((1 + Ca)Q_{in} - CpI_{in}) \tag{2}$$

The amplitude error and phase error on the received samples are calculated using the equations (3) and (4).

The amplitude error estimation may be obtained with:

$$Ca_k = \frac{\sum_N ((I + Q)(I - Q))}{2^{m_a}} + Ca_{k-1} \tag{3}$$

Figure 10:
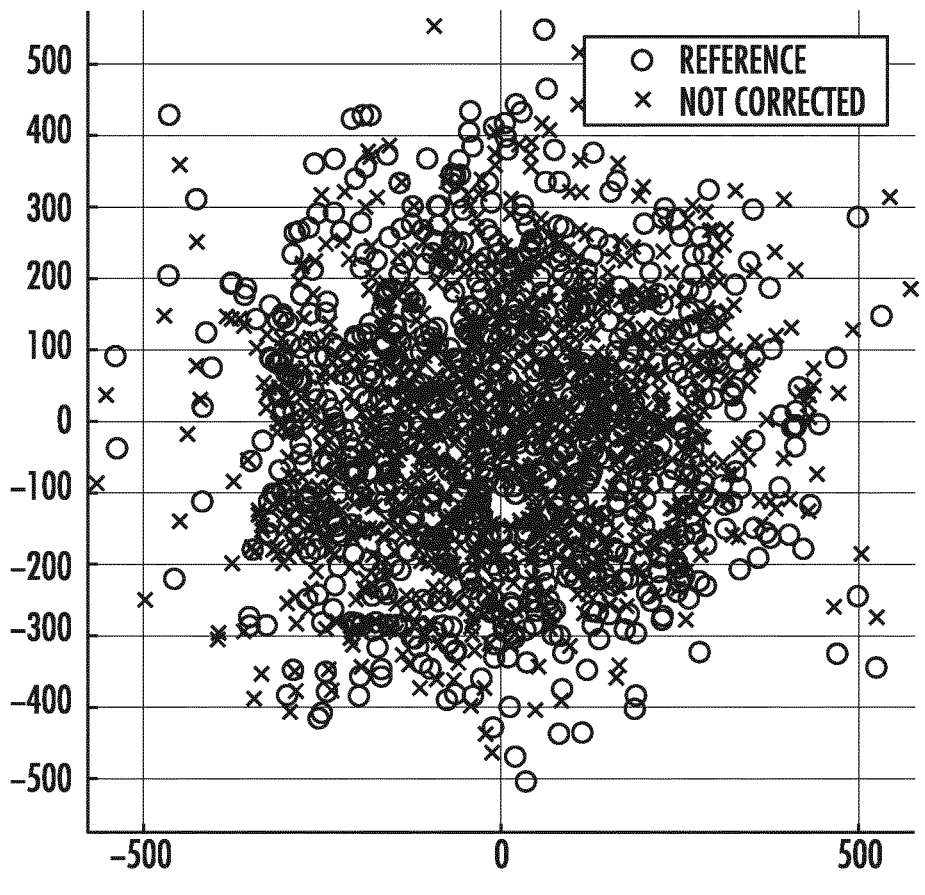
FIG. 10 shows noise from the PA or PA plus PPA and IQ-signal points (corrected) from the IQ-correction block before correction has started.

The phase error estimation may be obtained with:

$$Cp_k = \frac{\sum_N (I \cdot Q)}{2^{m_p}} + Cp_{k-1} \tag{4}$$

where,

I: In-phase input signal
Q: Quadrature input signal
N: Number of samples over which accumulation should run
$m_a$: Amplitude divisor
$m_p$: Phase divisor
k: Number of loops the error estimation process should run
$Ca_{k-1}$: Calculated amplitude estimation value
$Cp_{k-1}$: Calculated phase estimation value
$Ca_{k-1}$: Amplitude estimation value in previous loop
$Cp_{k-1}$: Phase estimation value in previous loop
Simulation Results:

Simulation results from a system design are discussed below. The starting point is that an IQ-amplitude error of 1 dB and a phase mismatch between I and Q mixer LO signal of 10 degrees are assumed. When feeding noise from the PA (Reference) the distortion on the IQ-signal points, uncorrected, are shown in FIG. 10, which shows noise from the PA or PA+PPA (Reference) and IQ-signal points, uncorrected, from the analog part of the receiver and sampled by the analog to digital converter (ADC). The DC-offset has been removed before plotting the signal.

The IQ-estimation loop calculate Ca and Cp and get a better and better estimate. The averaging of the estimate (via a first order infinite impulse response (IIR) filter) may be employed to suppress the randomness of the reference signal (the noise from the PA).

Figure 11:
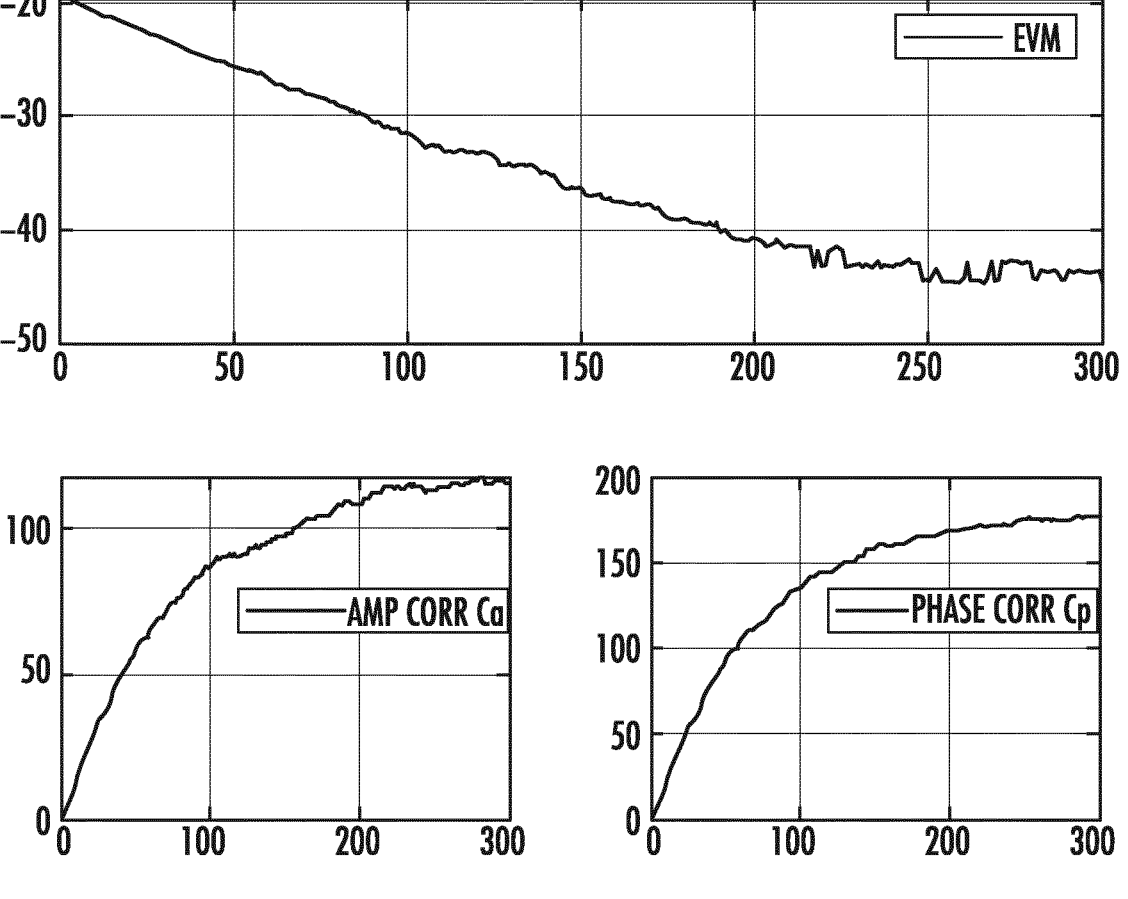
FIG. 11 shows an EVM of about −20 dB (10%) and after 250 iterations, a −45 dB (0.6%) level is reached.

FIG. 11 shows an EVM of about −20 dB (10%) and after 250 iterations, a −45 dB (0.6%) level is reached, which took approximately 1 ms. For cases where there is only a fine adjustment to be made a fraction of this time may be required to achieve satisfactory EVM. The simulation was done with 8 bit precision in the IQ-compensation block. With higher resolution even better correction can be expected.

FIG. 11 shows an example of EVM vs. iteration in the loop in the top graph. The two lower graphs show the Ca (Amplitude correction control word) and Cp (Phase correction control word) values vs. iteration.

Figure 12:
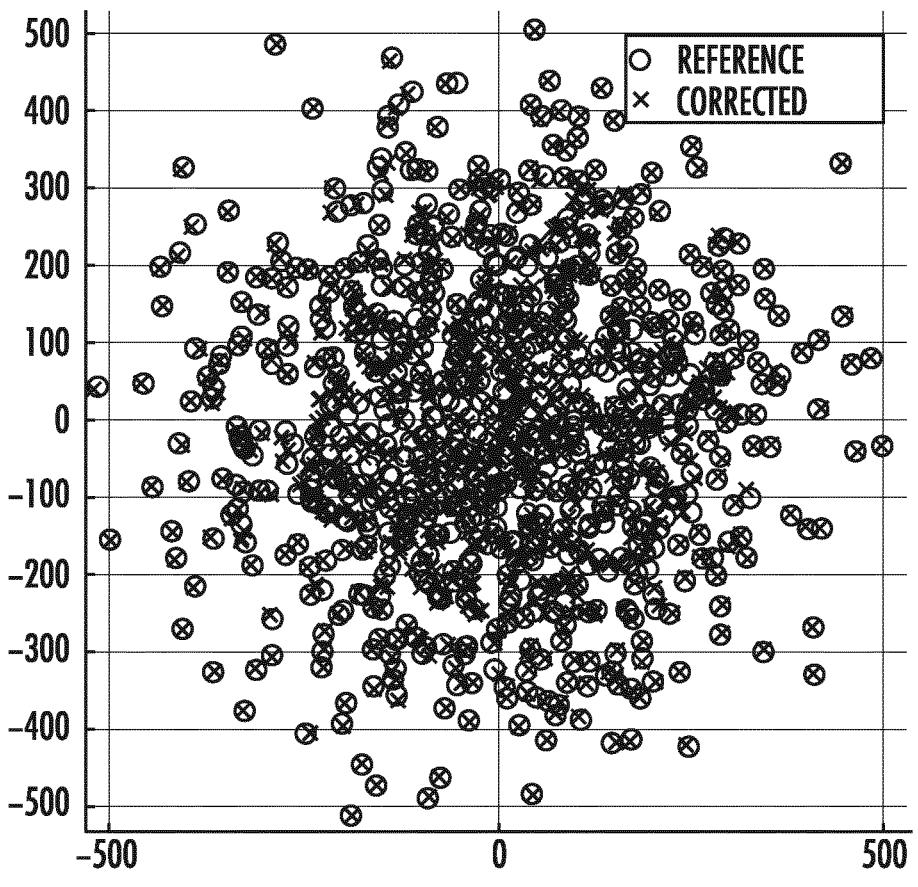
FIG. 12 shows noise from the PA or PA+PPA (Reference) and IQ-signal points (Corrected) from the IQ-correction block after a final iteration.

FIG. 12 shows an example of noise from the PA or PA+PPA (Reference) and IQ-signal points (Corrected) from the IQ-correction block after a final iteration.

According to one aspect, a processing circuit in a first receive path of a homodyne receiver 24, 26 is provided. The processing circuit includes an IQ error estimation circuit 24A, 26A configured to estimate an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver 24, 26 is disabled. The processing circuit also includes an IQ correction circuit 24B, 26B in electrical communication with the IQ error estimation circuit, the IQ correction circuit configured to correct the I and Q samples in the first receive path when the portion of transceiver circuitry of the homodyne receiver 24, 26 is subsequently reenabled, the corrections to the I and Q samples being based at least in part on the estimated amplitude and phase error.

According to this aspect, in some embodiments, the first function includes a sum over N samples of a difference between a square of an I sample and a square of a Q sample, and the second function includes a sum over N samples of a product of the I sample and the Q sample, N being a positive integer. In some embodiments, the IQ error estimation circuit is activated to perform estimates of amplitude errors and phase errors at a calibration time, the calibration time being set according to one of a change in temperature and a user input. In some embodiments, the noise is coupled from a power amplifier in a transmit path of the homodyne receiver 24, 26. In some embodiments, the noise is coupled from a feedback signal used to linearize the power amplifier. In some embodiments, the portion of transceiver circuitry of the homodyne receiver 24, 26 that is disabled includes all other receive paths of the homodyne receiver 24, 26 and all transmit paths of the homodyne receiver 24, 26. In some embodiments, the noise is coupled from a first antenna element of the homodyne receiver to a second antenna element of the homodyne receiver 24, 26. In some embodiments, the portion of the transceiver circuitry of the homodyne receiver 24, 26 that is disabled excludes a second receive path of the homodyne receiver 24, 26. In some embodiments, the first receive path is coupled to a first antenna of cross-polarized antenna elements and the second receive path is coupled to a second antenna of the cross-polarized antenna elements. In some embodiments, the corrections to the I and Q samples are linear combinations of the estimated amplitude and phase error and the I and Q samples.

According to another aspect, a method in a receive path of a homodyne receiver 24, 26 to estimate and correct an IQ error in a first receive path is provided. The method includes estimating an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver 24, 26 is disabled. The method also includes correcting the I and Q samples in the first receive path when the portion of transceiver circuitry of the homodyne receiver 24, 26 is subsequently reenabled, corrections to the I and Q samples being based at least in part on the estimated amplitude and phase error.

According to this aspect, in some embodiments, the first function includes a sum over N samples of a difference between a square of an I sample and a square of a Q sample, and the second function includes a sum over N samples of a product of the I sample and the Q sample, N being a positive integer. In some embodiments, the IQ error estimation circuit is activated to perform estimates of amplitude errors and phase errors at a calibration time, the calibration time being set according to one of a change in temperature and a user input. In some embodiments, the noise is coupled from a power amplifier in a transmit path of the homodyne receiver 24, 26. In some embodiments, the noise is coupled from a feedback signal used to linearize the power amplifier. In some embodiments, the portion of transceiver circuitry of the homodyne receiver 24, 26 that is disabled includes all other receive paths of the homodyne receiver 24, 26 and all transmit paths of the homodyne receiver 24, 26. In some embodiments, the noise is coupled from a first antenna element of the homodyne receiver to a second antenna element of the homodyne receiver 24, 26. In some embodiments, the portion of the transceiver circuitry of the homodyne receiver 24, 26 that is disabled excludes a second receive path of the homodyne receiver 24, 26. In some embodiments, the first receive path is coupled to a first antenna of cross-polarized antenna elements and the second receive path is coupled to a second antenna of the cross-polarized antenna elements. In some embodiments, the corrections to the I and Q samples are linear combinations of the estimated amplitude and phase error and the I and Q samples.

Some abbreviations that may appear herein have the following meanings:

AAS Advanced Antenna System
AMP Amplifier
BW Bandwidth
CW Continues Wave
DPD Digital Pre Distortion
EVM Error Vector Magnitude
HW Hardware
IF Intermediate Frequency
OFDM Orthogonal Frequency-Division Multiplexing
PA Power Amplifier
PPA Pre Power Amplifier
PLL Phase Looked Loop
RF Radio Frequency
SNDR Signal to Noise and Distortion Ratio As will be appreciated by one of skill in the art, the concepts described herein may be embodied as a method, hardware, and/or computer program product. Accordingly, the concepts described herein may take the form of an entirely hardware embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented at least in part by computer program instructions executed by a processor and/or by application specific circuitry.

Computer program code for carrying out operations of the concepts described herein may be written in an object oriented programming language such as Java® or C++. However, the computer program code for carrying out operations of the disclosure may also be written in conventional procedural programming languages, such as the "C" programming language Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A processing circuit in a first receive path of a homodyne receiver, the processing circuit configured to estimate and correct an IQ error in the first receive path, the processing circuit comprising;

an IQ error estimation circuit configured to estimate an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver is disabled; and an IQ correction circuit in electrical communication with the IQ error estimation circuit, the IQ correction circuit configured to correct the I and Q samples in the first receive path when the portion of transceiver circuitry of the homodyne receiver is subsequently reenabled, the corrections to the I and Q samples being based at least in part on the estimated amplitude and phase error.

2. The processing circuit of claim 1, wherein the first function includes a sum over N samples of a difference between a square of an I sample and a square of a Q sample, and the second function includes a sum over N samples of a product of the I sample and the Q sample, N being a positive integer.

3. The processing circuit of claim 1, wherein the IQ error estimation circuit is activated to perform estimates of amplitude errors and phase errors at a calibration time, the calibration time being set according to one of a change in temperature and a user input.

4. The processing circuit of claim 1, wherein the noise is coupled from a power amplifier in a transmit path of the homodyne receiver.

5. The processing circuit of claim 4, wherein the noise is coupled from a feedback signal used to linearize the power amplifier.

6. The processing circuit of claim 4, wherein the portion of transceiver circuitry of the homodyne receiver that is disabled includes all other receive paths of the homodyne receiver and all transmit paths of the homodyne receiver.

7. The processing circuit of claim 1, wherein the noise is coupled from a first antenna element of the homodyne receiver to a second antenna element of the homodyne receiver.

8. The processing circuit of claim 7, wherein the portion of the transceiver circuitry of the homodyne receiver that is disabled excludes a second receive path of the homodyne receiver.

9. The processing circuit of claim 8, wherein the first receive path is coupled to a first antenna of cross-polarized antenna elements and the second receive path is coupled to a second antenna of the cross-polarized antenna elements.

10. The processing circuit of claim 1, wherein the corrections to the I and Q samples are linear combinations of the estimated amplitude and phase error and the I and Q samples.

11. A method in a receive path of a homodyne receiver to estimate and correct an IQ error in a first receive path, the method comprising:

estimating an amplitude error based at least in part on a first function of I and Q samples and estimate a phase error based at least in part on a second function of the I and Q samples, the estimate of the amplitude error being further based at least in part on a prior estimate of the amplitude error and the estimate of the phase error being further based at least in part on a prior estimate of the phase error, the amplitude and phase errors arising from noise that is coupled to the first receive path when a portion of transceiver circuitry of the homodyne receiver is disabled; and correcting the I and Q samples in the first receive path when the portion of transceiver circuitry of the homodyne receiver is subsequently reenabled, corrections to the I and Q samples being based at least in part on the estimated amplitude and phase error.

12. The method of claim 11, wherein the first function includes a sum over N samples of a difference between a square of an I sample and a square of a Q sample, and the second function includes a sum over N samples of a product of the I sample and the Q sample, N being a positive integer.

13. The method of claim 11, wherein the estimating is activated at a calibration time, the calibration time being set according to one of a change in temperature and a user input.

14. The method of claim 11, wherein the noise is coupled from a power amplifier in a transmit path of the homodyne receiver.

15. The method of claim 14, wherein the noise is coupled from a feedback signal used to linearize the power amplifier.

16. The method of claim 14, wherein the portion of transceiver circuitry of the homodyne receiver that is disabled includes all other receive paths of the homodyne receiver and all transmit paths of the homodyne receiver.

17. The method of claim 11, wherein the noise is coupled from a first antenna element of the homodyne receiver to a second antenna element of the homodyne receiver.

18. The method of claim 17, wherein the portion of the transceiver circuitry of the homodyne receiver that is disabled excludes a second receive path of the homodyne receiver.

19. The method of claim 18, wherein the first receive path is coupled to a first antenna of cross-polarized antenna elements and the second receive path is coupled to a second antenna of the cross-polarized antenna elements.

20. The method of claim 11, wherein the corrections to the I and Q samples are linear combinations of the estimated amplitude and phase error and the I and Q samples.

* * * * *